US012292710B2

(12) United States Patent
Nakagawa

(10) Patent No.: US 12,292,710 B2
(45) Date of Patent: May 6, 2025

(54) IMAGE FORMING APPARATUS THAT INCLUDES AN ERASER DRIVE CIRCUIT

(71) Applicant: KYOCERA Document Solutions Inc., Osaka (JP)

(72) Inventor: Tatsuya Nakagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/623,440

(22) Filed: Apr. 1, 2024

(65) Prior Publication Data

US 2024/0337981 A1 Oct. 10, 2024

(30) Foreign Application Priority Data

Apr. 7, 2023 (JP) ................................ 2023-062648

(51) Int. Cl.

*G03G 21/08* (2006.01)
*G03G 15/00* (2006.01)
*G03G 15/01* (2006.01)
*G03G 21/00* (2006.01)

(52) U.S. Cl.

CPC ......... *G03G 21/08* (2013.01); *G03G 15/0105* (2013.01); *G03G 15/0178* (2013.01); *G03G 15/5004* (2013.01); *G03G 15/80* (2013.01); *G03G 21/0094* (2013.01)

(58) Field of Classification Search

CPC ........... G03G 15/0105; G03G 15/0178; G03G 15/5004; G03G 15/80; G03G 21/06; G03G 21/08; G03G 21/0094; H05B 45/30; H05B 45/345

See application file for complete search history.

(56) References Cited

U.S. PATENT DOCUMENTS

| | | | | |
|---|---|---|---|---|
| 8,019,241 B2 * | 9/2011 | Hamaya | G03G 21/06 | 399/34 |
| 2009/0010661 A1 * | 1/2009 | Hamaya | G03G 21/06 | 399/37 |
| 2014/0079419 A1 * | 3/2014 | Itani | G03G 21/06 | 399/128 |

FOREIGN PATENT DOCUMENTS

JP S 63-262668 A 10/1988

* cited by examiner

*Primary Examiner* — Sophia S Chen
(74) *Attorney, Agent, or Firm* — Stein IP LLC

(57) ABSTRACT

An image forming apparatus includes a plurality of image formation units, an eraser drive circuit, a static elimination voltage power supply and a control unit. The image formation unit includes an image carrying member, a charging device, a development device and a static eliminator. The eraser drive circuit drives light emitting diodes included in the static eliminators. The eraser drive circuit includes a monochrome drive circuit that drives only the light emitting diode included in the static eliminator provided in the image formation unit where the toner image of black is formed and a color drive circuit that drives the light emitting diodes included in the static eliminators provided in the image formation units where the toner images of all colors including black are formed, and the eraser drive circuit includes a common constant current drive circuit as a part of the monochrome drive circuit and the color drive circuit.

3 Claims, 5 Drawing Sheets

-Related art-

-Related art-

IMAGE FORMING APPARATUS THAT INCLUDES AN ERASER DRIVE CIRCUIT

INCORPORATION BY REFERENCE

This application is based upon and claims the benefit of priority from the corresponding Japanese Patent Application No. 2023-062648 filed on Apr. 7, 2023, the entire contents of which are incorporated herein by reference.

BACKGROUND

The present disclosure relates to image forming apparatuses of an electrophotographic system, and particularly relates to an image forming apparatus which includes a static eliminator that eliminates a residual charge on an image carrying member after transfer.

In an image forming apparatus of an electrophotographic system, a charging unit, an exposure unit, a development unit, a transfer unit, a cleaning unit, a static eliminator and the like are provided around an image carrying member. When image formation is performed, the charging unit uniformly charges the surface of the image carrying member, then the exposure unit performs exposure to form an electrostatic latent image on the surface of the image carrying member and the development unit further develops the electrostatic latent image. Thereafter, the developed toner image is transferred onto a recording medium by the transfer unit, and the recording medium is conveyed to a fixing unit to be fixed and is then ejected to the outside of the apparatus. The toner left on the image carrying member during transfer is removed by the cleaning unit. After the transfer, the static eliminator eliminates a residual charge on the image carrying member, and the image carrying member is charged again by the charging unit. The residual charge is eliminated before the charging, and thus then the surface of the image carrying member can be uniformly charged. For the elimination of the residual charge, for example, static elimination using light is used.

SUMMARY

An image forming apparatus according to an aspect of the present disclosure includes a plurality of image formation units, an eraser drive circuit, a static elimination voltage power supply and a control unit. Each of the image formation units includes an image carrying member in which a photosensitive layer is formed on a surface, a charging device that charges the surface of the image carrying member, a development device that develops an electrostatic latent image formed on the image carrying member into a toner image and a static eliminator that eliminates a residual charge on the image carrying member, and the image formation units form the toner images of a plurality of colors. The eraser drive circuit drives light emitting diodes included in the static eliminators. The static elimination voltage power supply applies a drive voltage to the eraser drive circuit. The control unit controls the eraser drive circuit and the static elimination voltage power supply. The eraser drive circuit includes a monochrome drive circuit that drives only the light emitting diode included in the static eliminator provided in the image formation unit in which the toner image of black is formed and a color drive circuit that drives the light emitting diodes included in the static eliminators provided in the image formation units in which the toner images of all the colors including black are formed, and the eraser drive circuit includes a common constant current drive circuit as a part of the monochrome drive circuit and the color drive circuit.

DETAILED DESCRIPTION

Figure 1:
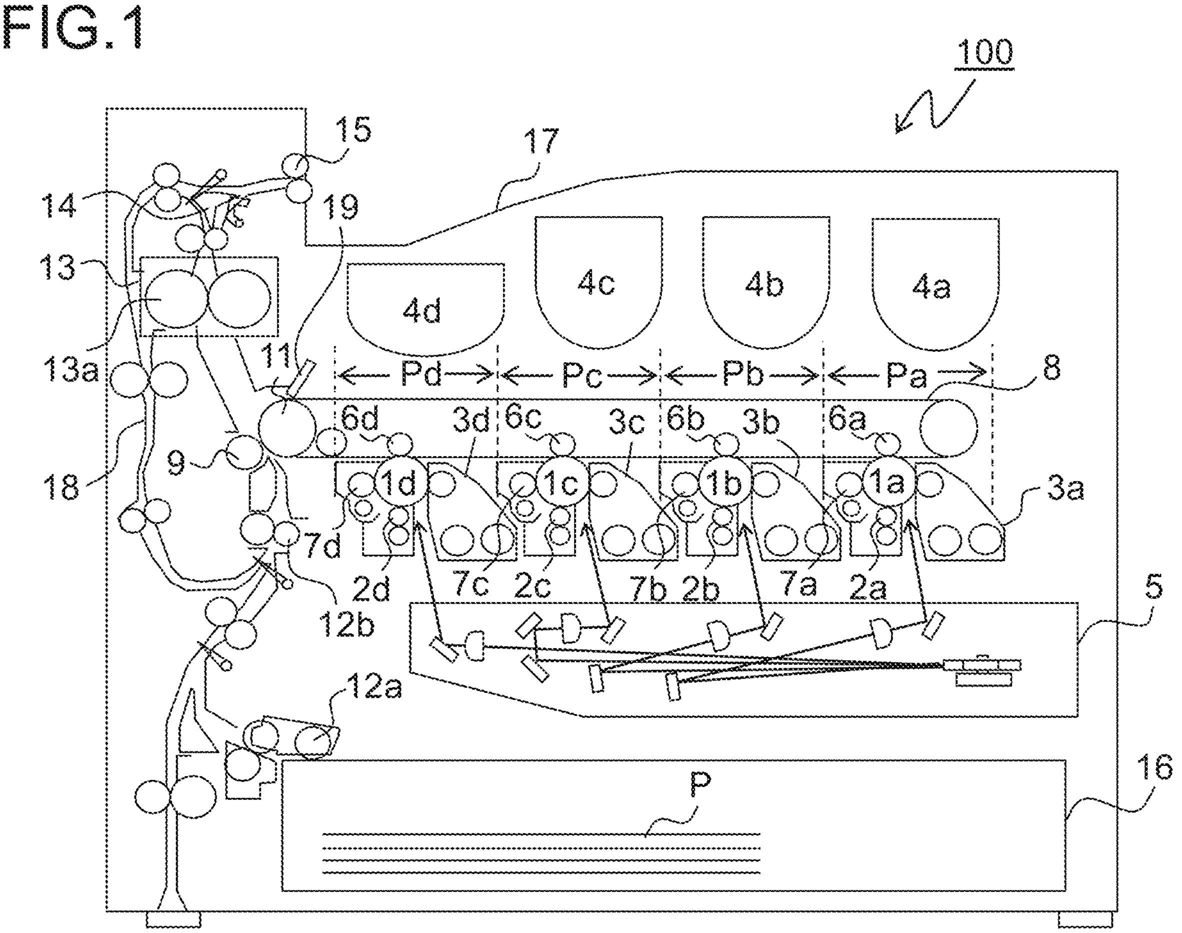
FIG. 1 is a side cross-sectional view showing the structure of an image forming apparatus according to an embodiment of the present disclosure.

An embodiment of the present disclosure will be described below with reference to drawings. FIG. 1 is a cross-sectional view showing the internal structure of an image forming apparatus 100 according to the embodiment of the present disclosure. In the main body of the image forming apparatus 100 (here, a color printer), four image formation units Pa, Pb, Pc and Pd are provided sequentially from an upstream side in a conveyance direction (the right side in FIG. 1). These image formation units Pa to Pd are provided to correspond to images of four different colors (yellow, cyan, magenta and black), and individually perform steps of charging, exposure, development and transfer to sequentially form images of yellow, cyan, magenta and black.

In these image formation units Pa to Pd, photosensitive drums (image carrying members) 1*a*, 1*b*, 1*c* and 1*d* which carry visible images (toner images) of the colors are provided, respectively. The photosensitive drums 1*a* to 1*d* are, for example, organic photosensitive members in which organic photosensitive layers (OPC) are stacked on the outer circumferential surface of a drum tube made of aluminum and a coat layer is further stacked on the surface of the organic photosensitive layers, and are driven to rotate by a main motor (not shown). Instead of the organic photosensitive drum, an amorphous silicon photosensitive drum in which an amorphous silicon photosensitive layer is formed on the outer circumferential surface of a drum tube can be used.

An intermediate transfer belt 8 which is rotated by a belt drive motor (not shown) in a clockwise direction in FIG. 1 is provided adjacent to the image formation units Pa to Pd. As the intermediate transfer belt 8, a dielectric resin sheet is used, and a belt which has no seam (seamless belt) is mainly used. On the downstream side of a secondary transfer roller 9, a belt cleaner 19 in the shape of a blade which removes toners and the like left on the surface of the intermediate transfer belt 8 is arranged.

Transfer sheets P on which the toner images are to be secondarily transferred are stored in a sheet cassette 16 arranged in a lower part of the main body of the image forming apparatus 100, and the transfer sheet P is conveyed via a paper feed roller 12*a* and a registration roller pair 12*b* into a nip portion between the secondary transfer roller 9 and a drive roller 11 for the intermediate transfer belt 8.

Figure 2:
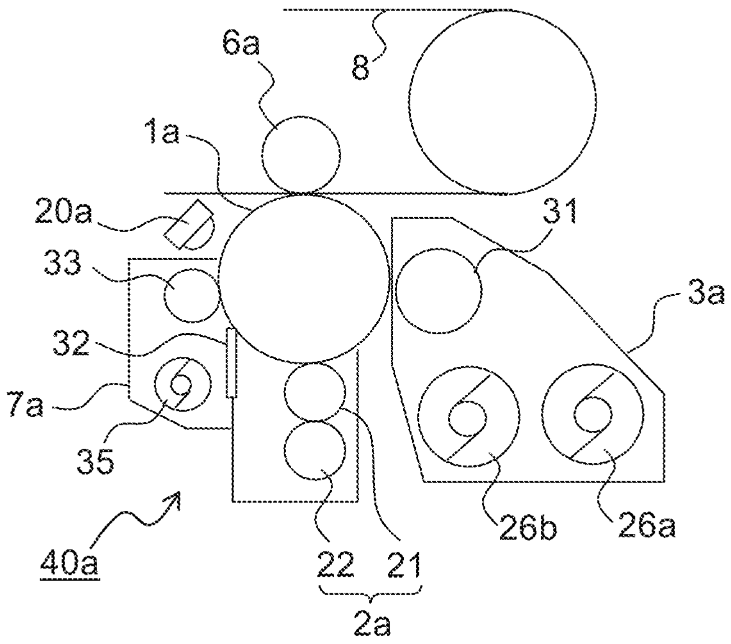
FIG. 2 is a partial enlarged view of an image formation unit in FIG. 1.

Then, the image formation units Pa to Pd will be described. FIG. 2 is an enlarged view around the image formation unit Pa in FIG. 1. Since the image formation units Pb to Pd basically have the same configuration, description thereof is omitted. As shown in FIG. 2, a charging device 2*a* which charges the photosensitive drum 1*a*, an exposure device 5 (see FIG. 1) which exposes the photosensitive drum 1*a* based on image information, a development device 3*a* which forms the toner image on the photosensitive drum 1*a*, a cleaning device 7*a* which removes a developer (toner) and the like left on the photosensitive drum 1*a* and a static eliminator 20*a* are provided around and below the photosensitive drum 1*a* which is rotatably provided, and a primary transfer roller 6*a* is arranged through the intermediate transfer belt 8.

The charging device 2*a* includes a charging roller 21 which is in contact with the photosensitive drum 1*a* to charge the surface of the photosensitive drum 1*a* and a charging cleaning roller 22 which cleans the charging roller 21. A charging voltage consisting of a direct-current voltage or a voltage obtained by superimposing an alternating voltage on a direct-current voltage is applied to the charging roller 21.

The development device 3*a* includes a development roller 31 opposite photosensitive drum 1*a*. A two-component developer formed with a magnetic carrier and the toner is stored in the development device 3*a*, the two-component developer is supplied to the development roller 31 by a stirring conveyance screw 26*a* and a supply conveyance screw 26*b* and a magnetic brush is formed on the development roller 31. A development voltage obtained by superimposing an alternating voltage on a direct-current voltage is applied to the development roller 31.

The cleaning device 7*a* includes: a cleaning blade 32 which removes a residual toner on the surface of the photosensitive drum 1*a*; a rubbing roller 33 which removes the residual toner on the surface of the photosensitive drum 1*a* and rubs the surface of the photosensitive drum 1*a* to polish the surface; and a conveyance spiral 35 which ejects, to the outside of the cleaning device 7*a*, the residual toner removed from the photosensitive drum 1*a* by the cleaning blade 32 and the rubbing roller 33.

The static eliminator 20*a* is arranged on the downstream side of the primary transfer roller 6*a* and on the upstream side of the cleaning device 7*a* in the direction of rotation of the photosensitive drum 1*a*. The static eliminator 20*a* applies static elimination light (erase light) to the photosensitive drum 1*a* to remove a residual charge on the surface of the photosensitive drum 1*a* such that the residual charge is equal to or less than a predetermined potential.

When image data is input from a host device such as a personal computer, the charging devices 2*a* to 2*d* first uniformly charge the surfaces of the photosensitive drums 1*a* to 1*d*. Then, the exposure device 5 applies light according to the image data to form electrostatic latent images corresponding to the image data on the photosensitive drums 1*a* to 1*d*. Predetermined amounts of two-component developers containing the toners of the colors of yellow, cyan, magenta and black are charged into the development devices 3*a* to 3*d*. When the ratios of the toners in the two-component developers charged into the development devices 3*a* to 3*d* drop below specified values due to the formation of the toner images described later, the toners are supplied from toner containers 4*a* to 4*d* to the development devices 3*a* to 3*d*. The toners in the developers are supplied by the development devices 3*a* to 3*d* onto the photosensitive drums 1*a* to 1*d* and are electrostatically adhered thereto, and thus the toner images corresponding to the electrostatic latent images formed by the exposure from the exposure device 5 are formed.

Then, an electric field is applied by the primary transfer rollers 6*a* to 6*d* between the primary transfer rollers 6*a* to 6*d* and the photosensitive drums 1*a* to 1*d* at a predetermined transfer voltage, and the toner images of yellow, cyan, magenta and black on the photosensitive drums 1*a* to 1*d* are primarily transferred onto the intermediate transfer belt 8. The images of these four colors are formed in a predetermined positional relationship for forming a predetermined full-color image. Thereafter, in order to prepare for the subsequent formation of new electrostatic latent images, toners and the like which are left on the surfaces of the photosensitive drums 1*a* to 1*d* after the primary transfer are removed by the cleaning devices 7*a* to 7*d*. The residual charges on the surfaces of the photosensitive drums 1*a* to 1*d* are removed by the static eliminators 20*a* to 20*d*.

When the intermediate transfer belt 8 starts to rotate in the clockwise direction, the transfer sheet P is conveyed from the registration roller pair 12*b* into the nip portion (secondary transfer nip portion) between the drive roller 11 and the secondary transfer roller 9 with predetermined timing, and thus the full-color image on the intermediate transfer belt 8 is secondarily transferred onto the transfer sheet P. The transfer sheet P on which the toner images have been transferred is conveyed to a fixing unit 13.

The transfer sheet P conveyed to the fixing unit 13 is heated and pressurized by the fixing roller pair 13*a*, the toner images are fixed to the surface of the transfer sheet P and the predetermined full-color image is formed. For the transfer sheet P on which the full-color image has been formed, the conveyance direction thereof is distributed by a branch portion 14 which is branched in a plurality of directions, and the transfer sheet P is ejected to an ejection tray 17 by an ejection roller pair 15 without being processed (or after being fed to a double-sided conveyance path 18 where images are formed on both surfaces).

Figure 3:
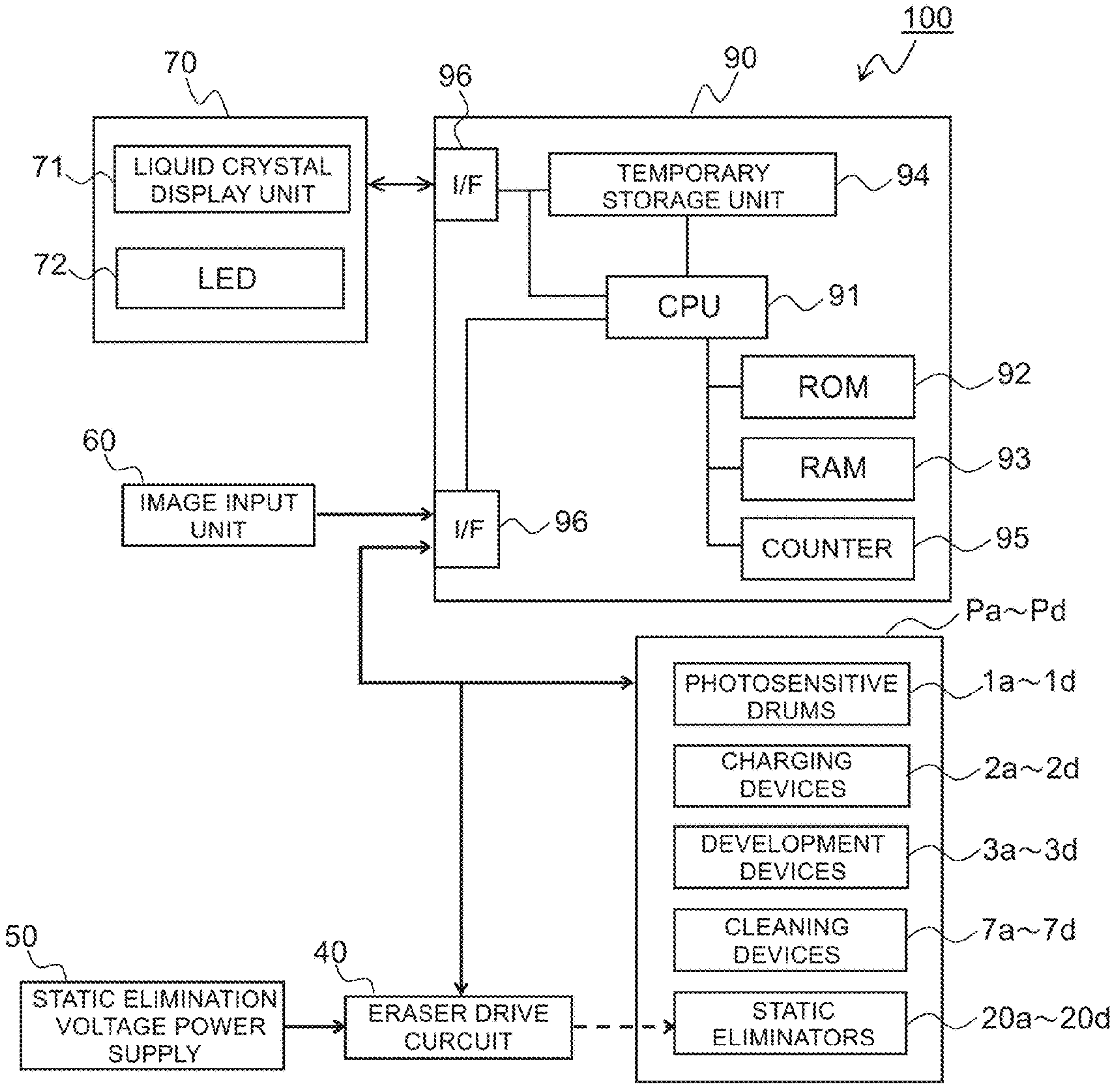
FIG. 3 is a block diagram showing an example of the control path of the image forming apparatus.

FIG. 3 is a block diagram showing an example of the control path of the image forming apparatus 100. Since various types of control are performed on the parts of the image forming apparatus 100 when the image forming apparatus 100 is used, the entire control path of the image forming apparatus 100 is complicated. Hence, parts of the control path necessary for implementing the present disclosure will be mainly described here.

An eraser drive circuit 40 is connected to a static elimination voltage power supply 50, and controls the drive of the static eliminators 20*a* to 20*d* by an output signal from a control unit 90. The details of the eraser drive circuit 40 will be described later.

An image input unit 60 is a reception unit which receives the image data transmitted from a personal computer or the like to the image forming apparatus 100. Image signals which are input from the image input unit 60 are converted to digital signals, and are thereafter fed to a temporary storage unit 94.

In an operation unit 70, a liquid crystal display unit 71 and LEDs 72 which indicate various states are provided, the state of the image forming apparatus 100 is indicated and the status of image formation and the number of sheets printed are displayed by the liquid crystal display unit 71 and the LEDs 72. Various types of settings for the image forming apparatus 100 are performed from the print driver of the personal computer.

Furthermore, in the operation unit 70, a start button with which a user provides an instruction to start the image formation, a stop/clear button which is used, for example, when the image formation is stopped, a reset button which is used when the various types of settings for the image forming apparatus 100 are brought into default states and the like are provided.

The control unit 90 includes at least a CPU (Central Processing Unit) 91 which serves as a central processor, a ROM (Read Only Memory) 92 which is a read-only storage unit, a RAM (Random Access Memory) 93 which is a read/write storage unit, the temporary storage unit 94 which temporarily stores the image data and the like, a counter 95 and a plurality of (here, two) I/Fs (interfaces) 96 which transmit control signals to the devices in the image forming apparatus 100 and receive input signals from an operation unit 70. The control unit 90 can be arranged in any location inside the main body of the image forming apparatus 100.

The ROM 92 stores data and the like which are not changed during use of the image forming apparatus 100 such as control programs for the image forming apparatus 100 and numerical values necessary for control. The RAM 93 stores necessary data which is generated under control of the image forming apparatus 100, data which is temporarily necessary for control of the image forming apparatus 100 and the like. The temporary storage unit 94 temporarily stores the image signals which are input from the image input unit 60 and are converted to digital signals. The counter 95 cumulates and counts the number of sheets printed.

The control unit 90 transmits the control signals to the parts and devices in the image forming apparatus 100 from the CPU 91 via the I/Fs 96. The parts and devices transmit signals indicating the states thereof and the input signals to the CPU 91 via the I/Fs 96. Examples of the parts and devices controlled by the control unit 90 include the image formation units Pa to Pd, the eraser drive circuit 40, the image input unit 60, the operation unit 70 and the like.

Figure 4:
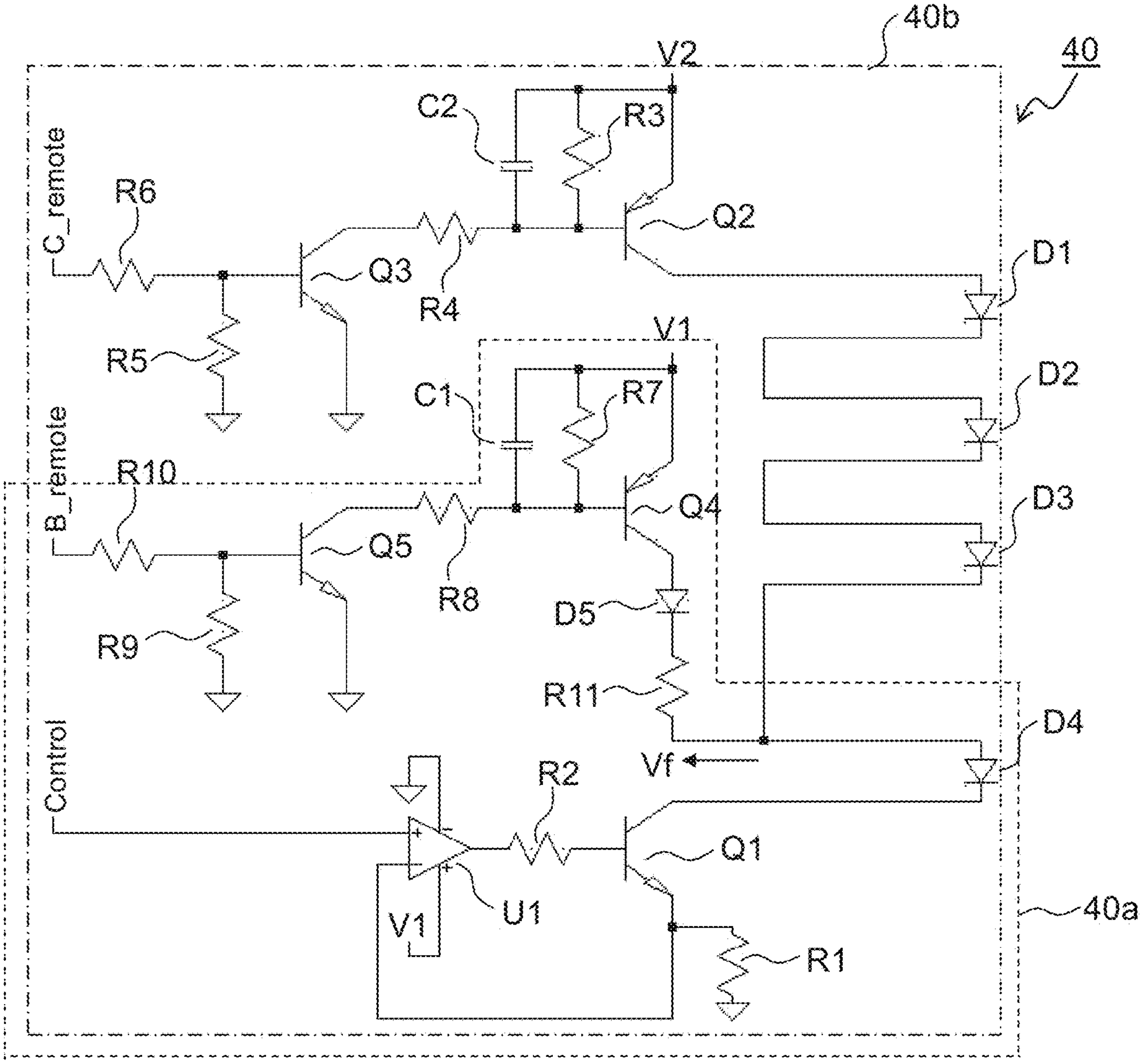
FIG. 4 is a circuit diagram of an eraser drive circuit which drives a static eliminator in the image forming apparatus of the present embodiment.

FIG. 4 is a circuit diagram of the eraser drive circuit 40 which drives the static eliminators 20*a* to 20*d* in the image forming apparatus 100 of the present embodiment. The eraser drive circuit 40 includes diodes D1 to D5, an operational amplifier U1, transistors Q1 to Q5, capacitors C1 and C2 and resistors R1 to R11.

The diodes D1 to D4 are light emitting diodes (LEDs) and are included in the static eliminators 20*a* to 20*d*, respectively, and apply the static elimination light (erase light) to the photosensitive drums 1*a* to 1*d* for yellow, cyan, magenta and black.

In monochrome printing, the control unit 90 transmits a black control signal B_remote to apply a drive voltage V1 (first drive voltage) from the static elimination voltage power supply 50. In this way, a current flows through a monochrome drive circuit 40*a* (in a portion indicated by dashed lines in FIG. 4) which includes the transistor Q4, the diode D5, the resistor R11, the diode D4, the transistor Q1 and the resistor R1, and the diode D4 for the image of black emits light.

Here, a color control signal C_remote is not transmitted, and a drive voltage V2 is not applied from the static elimination voltage power supply 50. Hence, no current flows through the diodes D1 to D3 for yellow, cyan and magenta.

In color printing, the control unit 90 transmits the color control signal C_remote to apply the drive voltage V2 (second drive voltage) from the static elimination voltage power supply 50. In this way, a current flows through a color drive circuit 40*b* (in a portion indicated by alternate long and short dashed lines in FIG. 4) which includes the transistor Q2, the diodes D1 to D4, the transistor Q1 and the resistor R1, and the diodes D1 to D4 for the image of yellow, cyan, magenta and black emit light.

Here, the black control signal B_remote is not transmitted, and thus the drive voltage V1 is not applied from the static elimination voltage power supply 50. In other words, the drive voltage V1 needs a voltage for driving the one diode D4, and the drive voltage V2 needs a voltage for driving the four diodes D1 to D4.

Although the black control signal B_remote and the color control signal C_remote are not basically transmitted simultaneously, even when both the signals are transmitted due to a program bug or the like, the diode D5 is arranged such that a current is prevented from flowing from an input terminal for the drive voltage V2 into an input terminal for the drive voltage V1. The resistor R11 ahead of the diode D5 is arranged in order to absorb a potential difference between the drive voltages V1 and V2 and a forward voltage Vf for the diodes D1 to D4.

Figure 5:
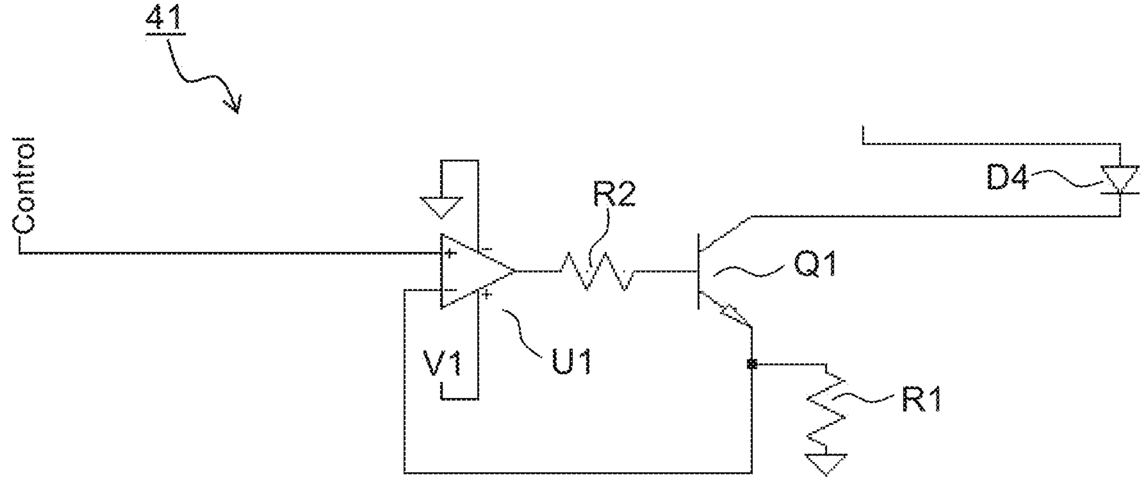
FIG. 5 is a circuit diagram showing a part of a constant current drive circuit in an eraser control circuit in FIG. 4.

FIG. 5 is a circuit diagram showing a part of a constant current drive circuit 41 in the eraser drive circuit 40 in FIG. 4. The constant current drive circuit 41 is a part of the eraser drive circuit 40 which includes the operational amplifier U1, the transistor Q1 and the resistors R1 and R2.

In FIG. 5, the current for causing the diodes D1 to D4 to emit light flows through the transistor Q1 and the resistor R1 to ground (GND). In the constant current drive circuit 41, the current can be controlled by a Control voltage of the positive input terminal of the operational amplifier U1.

The operational amplifier U1 adjusts the base current of the transistor Q1 such that the negative input terminal thereof has the same potential as the positive input terminal. Hence, the voltage of the resistor (limiting resistor) R1 connected to the negative input terminal of the operational amplifier U1 is the same potential as the positive input terminal of the operational amplifier U1. For example, when the Control voltage is 1.0 [V], and the resistor R1 is 10 [Ω], a constant current circuit of 1.0/10=100 [mA] is provided.

Since the drive voltages V1 and V2 and the number of diodes which are driven are different between the monochrome printing and the color printing, the voltage which is applied to the constant current drive circuit 41 (the transistor Q1 and the resistor R1) is changed but an increase or a decrease in the voltage is applied to transistor Q1, with the result that the voltage applied to the resistor R1 is not changed. Hence, the same current can be caused to flow both during the monochrome printing and during the color printing without the resistance value of the resistor R1 being changed.

Figure 6:
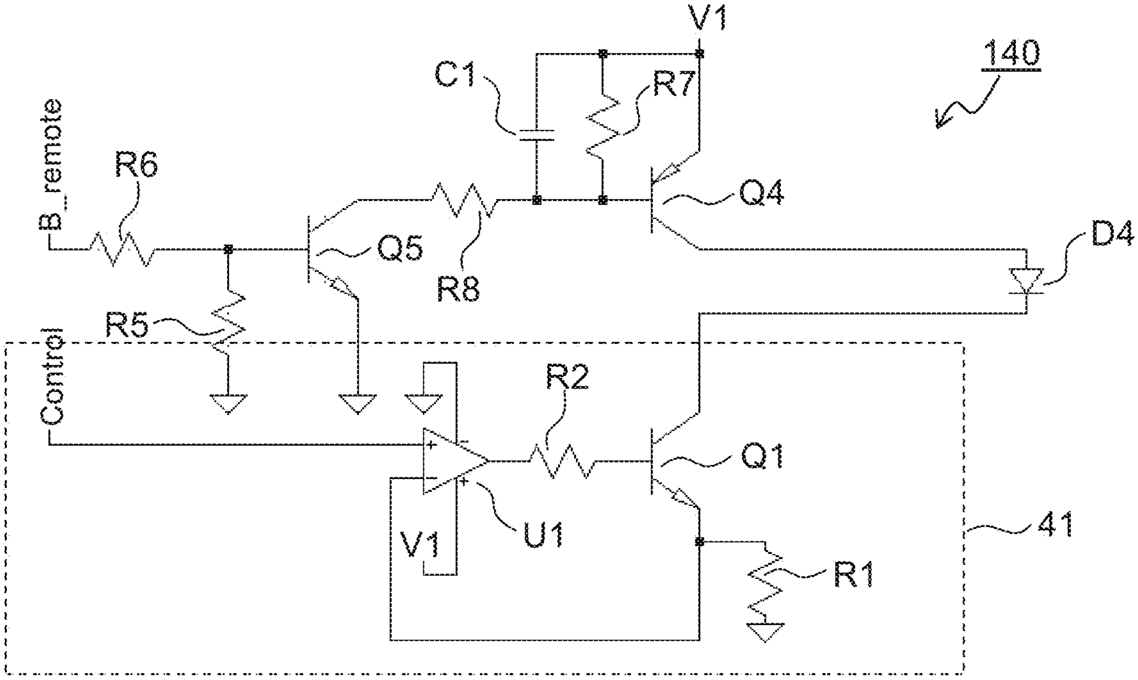
FIG. 6 is a circuit diagram of a conventional monochrome drive circuit which drives a static eliminator.
Figure 7:
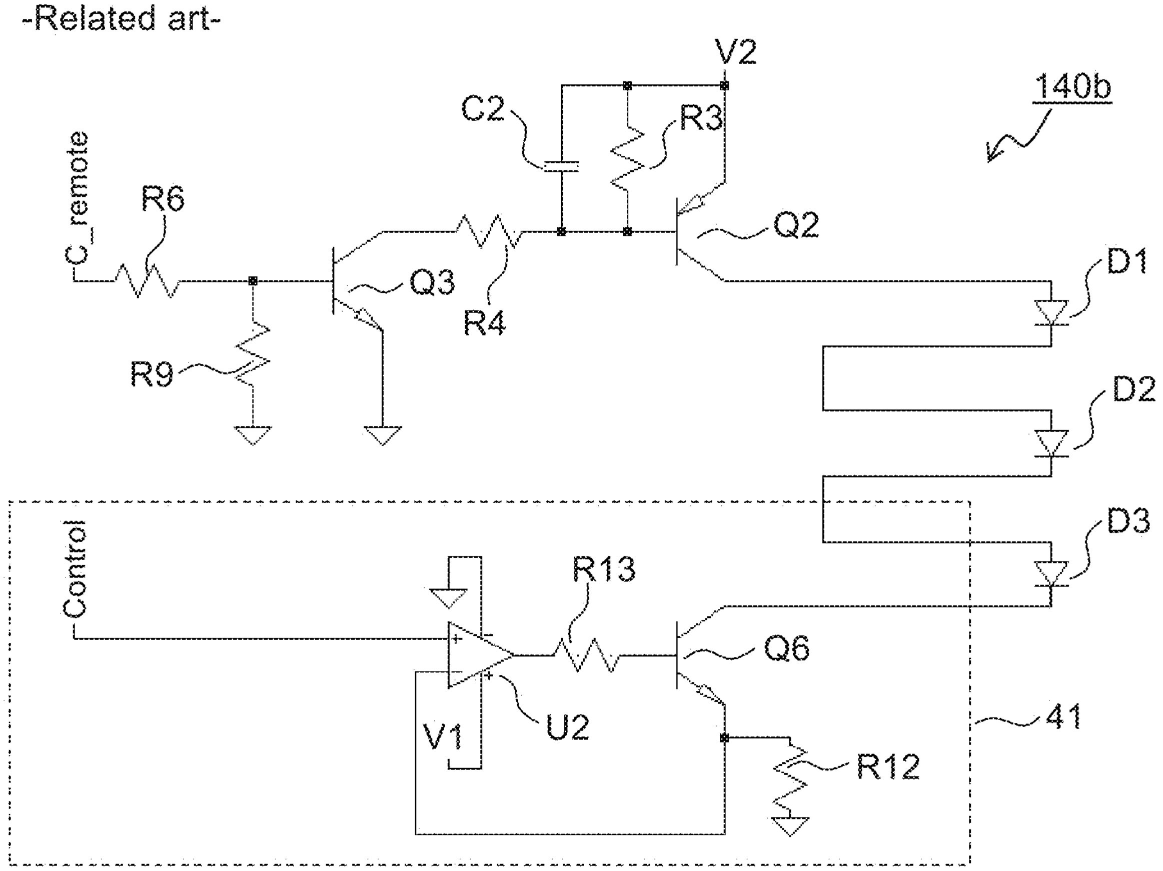
FIG. 7 is a circuit diagram of a conventional color drive circuit which drives a static eliminator.

FIG. 6 is a circuit diagram of a conventional monochrome drive circuit 140*a* which drives the static eliminator 20*d*. FIG. 7 is a circuit diagram of a conventional color drive circuit 140*b* which drives the static eliminators 20*a* to 20*c*. As shown in FIGS. 6 and 7, each of the conventional monochrome drive circuit 140*a* and the conventional color drive circuit 140*b* includes a separate constant current drive circuit 41.

The eraser drive circuit 40 of the present embodiment includes the common constant current drive circuit 41 as a part of the monochrome drive circuit 40*a* and the color drive circuit 40*b*. In this way, as compared with a conventional circuit configuration shown in FIGS. 6 and 7, one constant current drive circuit 41 (an operational amplifier U2, a transistor Q6 and resistors R12 and R13) can be removed.

Although the components (the diode D5 and the resistor R11) are added as compared with the conventional circuit configuration, a cost which is reduced by the constant current drive circuit 41 is higher. Hence, the number of components in the eraser drive circuit 40 is reduced, and thus it is possible to achieve a lower cost.

In the eraser drive circuit 40 of the present embodiment, the drive voltages V1 and V2 which are used are switched between the monochrome printing and the color printing, and thus it is possible to suppress power consumption in the color printing as compared with the conventional circuit configuration shown in FIGS. 6 and 7.

For example, consideration is given to a case where the drive voltage V1 in the monochrome printing is 5 [V], the drive voltage V2 in the color printing is 10 [V] and a drive current is 100 [mA].

When the forward voltage Vf is 2.0 [V] and the limiting resistor R1 has 10 [Ω], the drive voltage V2 necessary for driving the diodes D1 to D3 using the conventional color drive circuit 140*b* shown in FIG. 7 is 2.0 [V]×3 (colors)+10 [Ω]×100 [mA]=7.0 [V].

When the forward voltage Vf is 2.0 [V] and the limiting resistor R1 has 10 [Ω], the drive voltage V2 necessary for driving the diodes D1 to D4 using the eraser drive circuit 40 of the present embodiment shown in FIG. 4 is 2.0 [V]×4 (colors)+10 [Ω]×100 [mA]=9.0 [V].

In the conventional color drive circuit 140*b* shown in FIG. 7, the three diodes D1 to D3 are driven. Hence, as compared with the eraser drive circuit 40 of the present embodiment which drives the four diodes D1 to D4, the necessary drive voltage V2 is decreased but the minimum necessary voltage generation circuit is not prepared only for driving the diodes D1 to D4. Therefore, it is assumed that a power supply of 10 [V] is used for a circuit other than the eraser drive circuit, and thus the drive voltage V2 in the color printing is set to 10 [V] both for the conventional color drive circuit 140*b* and the eraser drive circuit 40 of the present embodiment.

The power consumption of the conventional monochrome drive circuit 140*a* in the color printing is V1×drive current=5 [V]×100 [mA]=0.5 [W], and the power consumption of the conventional color drive circuit 140*b* in the color printing is V2×drive current=10 [V]×100 [mA]=1.0 [W]. The total power consumption is 1.5 [W]=0.5 [W]+1.0 [W].

On the other hand, the power consumption of the eraser drive circuit 40 of the present embodiment in the monochrome printing is V1×drive current=5 [V]×100 [mA]=0.5 [W], and the power consumption in the color printing is V2×drive current=10 [V]×100 [mA]=1.0 [W].

In other words, the eraser drive circuit 40 of the present embodiment is used, and thus the power consumption in the monochrome printing is equivalent to that in the conventional circuit configuration but the power consumption in the color printing is significantly reduced. Hence, the running costs of the image forming apparatus 100 can be suppressed.

The present disclosure is not limited to the embodiment described above, and various changes can be made without departing from the spirit of the present disclosure. For example, in the present embodiment, the one static elimination voltage power supply 50 is used to be able to apply the different drive voltages V1 and V2 to the eraser drive circuit 40, and thus it is possible to switch between the drive voltage V1 applied during the monochrome printing and the drive voltage V2 applied during the color printing. Instead of the configuration described above, two static elimination voltage power supplies, that is, a monochrome static elimination voltage power supply which applies the drive voltage V1 and a color static elimination voltage power supply which applies the drive voltage V2 may be provided.

Although in the above embodiment, the eraser drive circuit 40 for the static eliminators 20*a* to 20*d* which performs post-transfer erasing to eliminate the residual charge after the toner images are transferred onto the photosensitive drums 1*a* to 1*d* is described, the present disclosure can be applied to a static eliminator which performs pre-transfer erasing to eliminate a charge around the toner images before the toner images are transferred onto the photosensitive drums 1*a* to 1*d*.

Although in the embodiment described above, the example is shown where the present disclosure is applied to the color printer as shown in FIG. 1 as the image forming apparatus 100 including the static eliminators 20*a* to 20*d*, the present disclosure may be applied to other image forming apparatuses, such as a color copying machine and a color multi-functional peripheral, which include a plurality of static eliminators according to a plurality of toner colors.

The present disclosure can be utilized for an image forming apparatus which includes a static eliminator for eliminating a residual charge on an image carrying member. By the utilization of the present disclosure, it is possible to provide an image forming apparatus which can reduce the number of components and achieve a lower cost.

What is claimed is:

1. An image forming apparatus comprising:

a plurality of image formation units each of which includes an image carrying member in which a photosensitive layer is formed on a surface, a charging device that charges the surface of the image carrying member, a development device that develops an electrostatic latent image formed on the image carrying member into a toner image and a static eliminator that eliminates a residual charge on the image carrying member, and which form the toner images of a plurality of colors;

an eraser drive circuit that drives light emitting diodes included in the static eliminators;

a static elimination voltage power supply that applies a drive voltage to the eraser drive circuit; and a control unit that controls the eraser drive circuit and the static elimination voltage power supply, wherein the eraser drive circuit includes a monochrome drive circuit that drives only the light emitting diode included in the static eliminator provided in the image formation unit in which the toner image of black is formed and a color drive circuit that drives the light emitting diodes included in the static eliminators provided in the image formation units in which the toner images of all the colors including black are formed, and the eraser drive circuit includes a common constant current drive circuit as a part of the monochrome drive circuit and the color drive circuit.

2. The image forming apparatus according to claim 1, wherein the control unit transmits a control signal to the monochrome drive circuit during monochrome printing to apply a first drive voltage from the static elimination voltage power supply to the monochrome drive circuit, and the control unit transmits a control signal to the color drive circuit during color printing to apply a second drive voltage higher than the first drive voltage from the static elimination voltage power supply to the color drive circuit.

3. The image forming apparatus according to claim 2, wherein in the monochrome drive circuit, a diode is arranged that regulates flow of a drive current into the monochrome drive circuit when the control unit transmits the control signals to both the monochrome drive circuit and the color drive circuit.

* * * * *